(12) United States Patent
Lai (10) Patent No.: US 8,585,104 B2
(45) Date of Patent: Nov. 19, 2013

(54) ELECTRONIC DEVICE

(75) Inventor: Chien-Hua Lai, Taipei (TW)

(73) Assignee: Inventec Corporation, Taipei (TW)

( * ) Notice: Subject to any disclaimer, the term of this patent is extended or adjusted under 35 U.S.C. 154(b) by 356 days.

(21) Appl. No.: 12/979,330

(22) Filed: Dec. 28, 2010

(65) Prior Publication Data

US 2012/0126675 A1 May 24, 2012

(30) Foreign Application Priority Data

Nov. 23, 2010 (CN) ..................... 2010 2 0624550 U (51) Int. Cl.
*E05C 1/08* (2006.01)

(52) U.S. Cl.
USPC .................... 292/163; 292/137; 292/DIG. 37

(58) Field of Classification Search
USPC .............. 292/163, 137, DIG. 37, 1, 175, 138, 292/145, DIG. 11, DIG. 63
See application file for complete search history.

(56) References Cited

U.S. PATENT DOCUMENTS 7,333,324 B2 * 2/2008 DeLuga ................... 361/679.55

* cited by examiner

*Primary Examiner* — Carlos Lugo
*Assistant Examiner* — Mark Williams
(74) *Attorney, Agent, or Firm* — CKC & Partners Co., Ltd.

(57) ABSTRACT

An electronic device including a casing, a cover, a latching member, and a limiting member is provided. The casing has a space and a stopping portion on an inner wall of the casing and in the pace. The cover is detachably assembled to the casing for covering the space. The latching member on the inner wall of the casing and in the space has a body moving relative to the casing between a first position and a second position and a limiting portion with a limiting route. The stopping portion is in a moving path of the latching member. The limiting member is assembled to the casing and interferes with the limiting portion. When the limiting member interferes with the limiting portion, the body is limited at the first position and a third position between the first position and the second position relative to the casing.

8 Claims, 9 Drawing Sheets

ELECTRONIC DEVICE

CROSS-REFERENCE TO RELATED APPLICATION

This application claims the priority benefit of China application serial no. 201020624550.8, filed on Nov. 23, 2010. The entirety of the above-mentioned patent application is hereby incorporated by reference herein and made a part of specification.

BACKGROUND OF THE INVENTION

1. Field of the Invention

The present invention generally relates to an electronic device, in particular, to a latching structure for installing or detaching a cover of the electronic device.

2. Description of Related Art

Currently, when a cover at the back side of a notebook computer needs to be installed or detached, several latching structures are generally required to achieve the purpose. For example, the latching structure of the notebook computer generally includes a buckling module for buckling the cover and an urging module for pushing the cover out of a case. During the implementation, a user controls the buckling module and the urging module at the same time by two hands respectively, so as to successfully install or detach the cover. Further, the locking structure of the cover is usually exposed out of the back side of the case, so that an electronic device assembled in the case, for example, a hard disk or a memory, is at the risk of being stolen. Therefore, the convenience of use and the security of the device are greatly affected.

SUMMARY OF THE INVENTION

Accordingly, the present invention is directed to an electronic device, which includes a latching structure enabling a user to conveniently install or detach a cover of the electronic device.

The present invention provides an electronic device, which includes a casing, a cover, a latching member, and a limiting member. The casing has an accommodation space and a first stopping portion, and the first stopping portion is disposed on an inner wall of the casing and is located in the accommodation space. The cover is detachably assembled to the casing along a first axis. The latching member has a main body and a limiting portion. The main body moves relative to the casing between a first position and a second position along a second axis. The first stopping portion is located in a moving path of the latching member. The limiting member is detachably assembled to the casing and interferes with the limiting portion. The limiting portion has a limiting route. When the limiting member interferes with the limiting portion, a start point and an end point of the limiting route respectively limit the main body at the first position and a third position relative to the casing, in which the third position is between the first position and the second position.

In an embodiment of the present invention, the electronic device further includes a handle, movably assembled on the casing and connected to the main body to move with the main body. An orthogonal projection of the limiting member on the casing is located in an orthogonal projection of the handle between the first position and the third position on the casing.

In an embodiment of the present invention, the main body has a recessed portion, the latching member further has a first buckling portion and a first urging portion, and the first buckling portion and the first urging portion are located in two opposite sides of the recessed portion.

In an embodiment of the present invention, the cover has a hook, located on the casing and in the recessed portion of the main body. The hook has a second buckling portion and a second urging portion, respectively corresponding to the first buckling portion and the first urging portion.

In an embodiment of the present invention, the first buckling portion and the second buckling portion are respectively a plane perpendicular to the first axis.

In an embodiment of the present invention, the first urging portion and the second urging portion are respectively a plane forming an acute angle with the first axis.

In an embodiment of the present invention, the main body further has a third urging portion, with its back side facing the recessed portion, and the hook further has a fourth urging portion corresponding to the third urging portion. The third urging portion and the fourth urging portion are respectively a plane forming an acute angle with the first axis.

In an embodiment of the present invention, the electronic device further includes an elastic member, connected between the casing and the main body, for providing the main body with an elastic force in parallel with the second axis.

In an embodiment of the present invention, the latching member further has a second stopping portion extending from the main body and located in the moving path of the first stopping portion. A position where the first stopping portion interferes with the second stopping portion of the main body is the third position of the main body relative to the casing.

In an embodiment of the present invention, the second stopping portion has a protrusion facing the first stopping portion and an elastic arm connected between the main body and the protrusion.

In view of the above, according to the embodiments of the present invention, in the electronic device, through the cooperation of the stopping portions of the latching member and the casing, the latching member only returns to the third position between the first position and the second position after the cover is detached, so that when the user intends to install the cover, only a small force is required to retain the cover on the casing. Therefore, in the electronic device of the present invention, the cover can be installed or detached conveniently by using a few components.

In order to make the above features and advantages of the present invention comprehensible, embodiments are described in detail below with the accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1A:
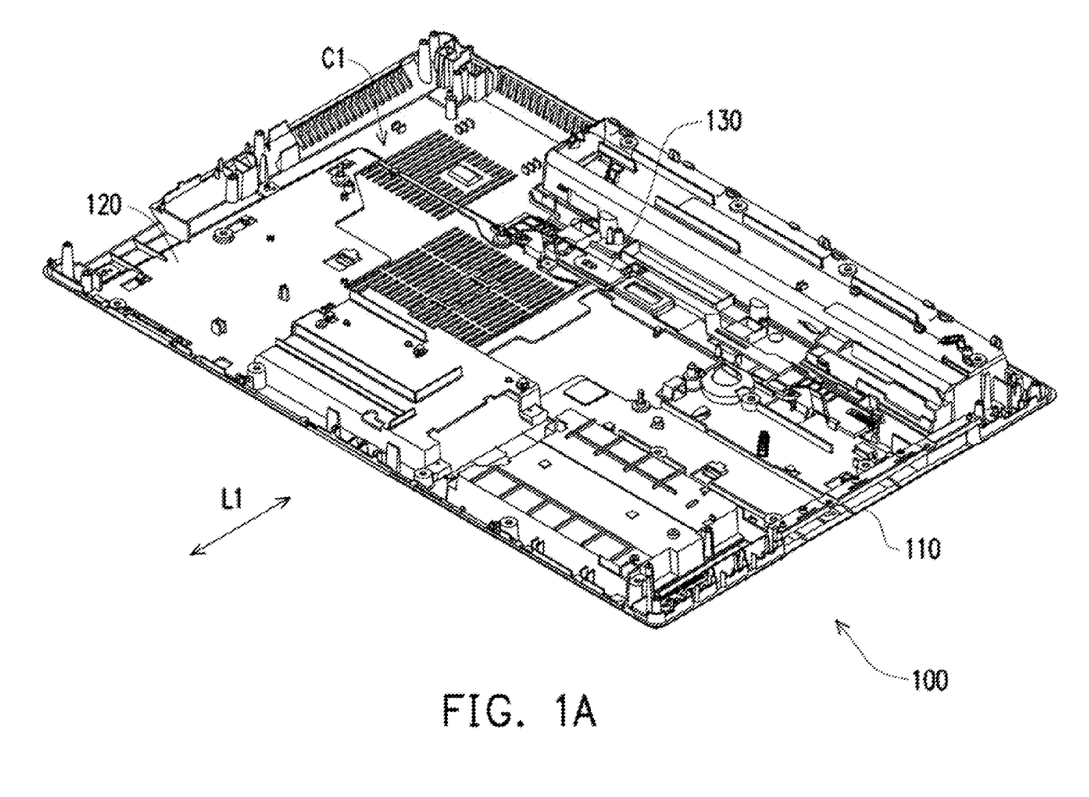
FIG. 1A and FIG. 1B are respectively schematic views of an electronic device at different viewing angles according to an embodiment of the present invention.
Figure 1B:
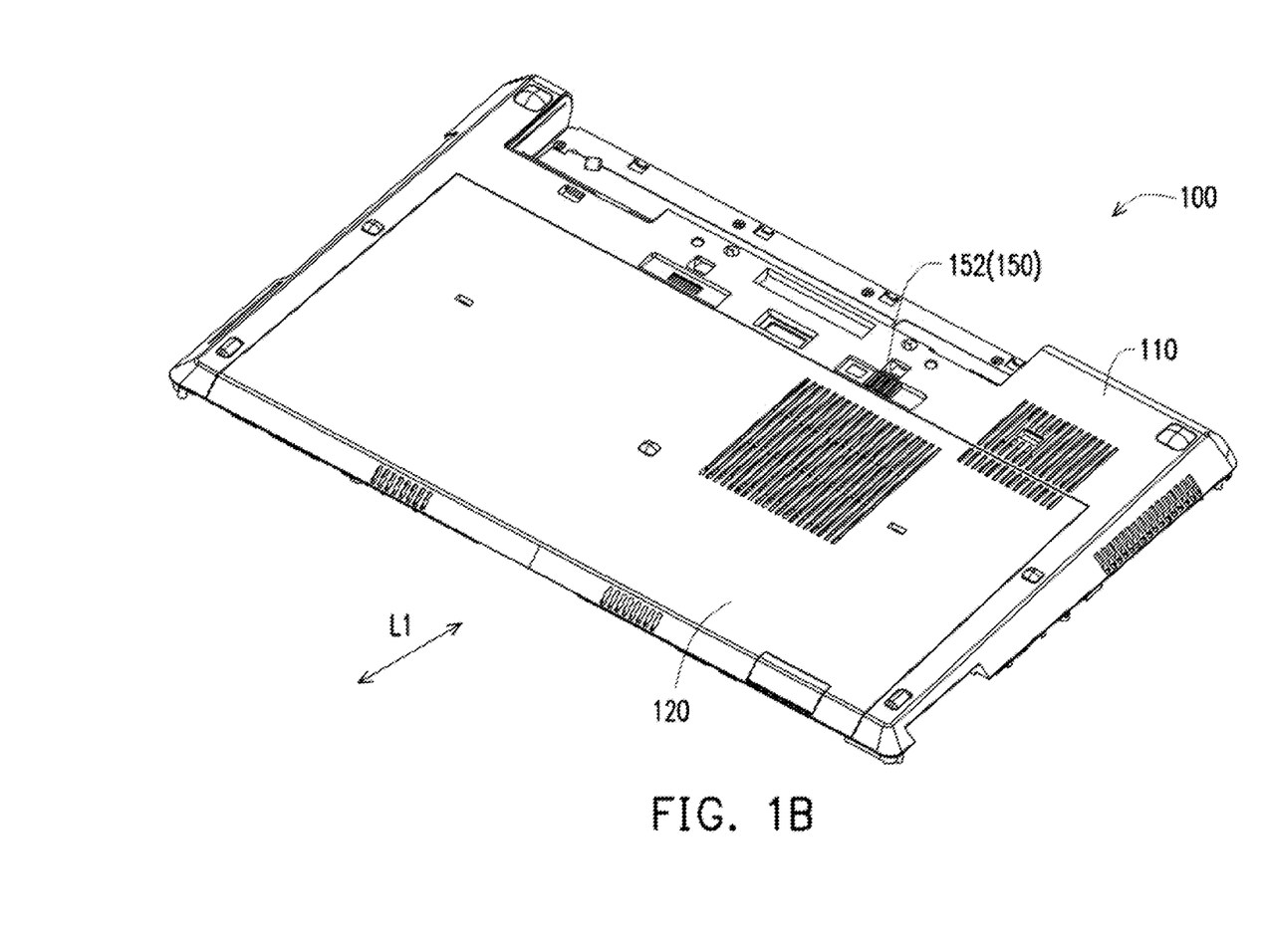
Figure 2A:
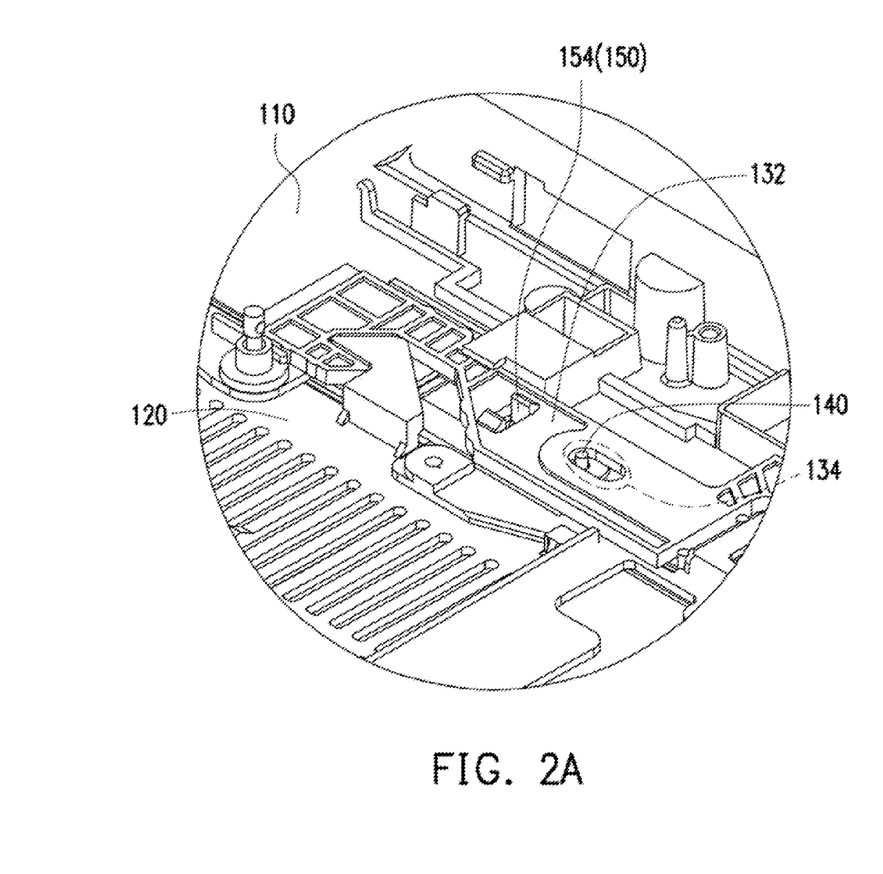
FIG. 2A and FIG. 2B are respectively partial enlarged views of the electronic device in FIG. 1A at different parts.
Figure 2B:
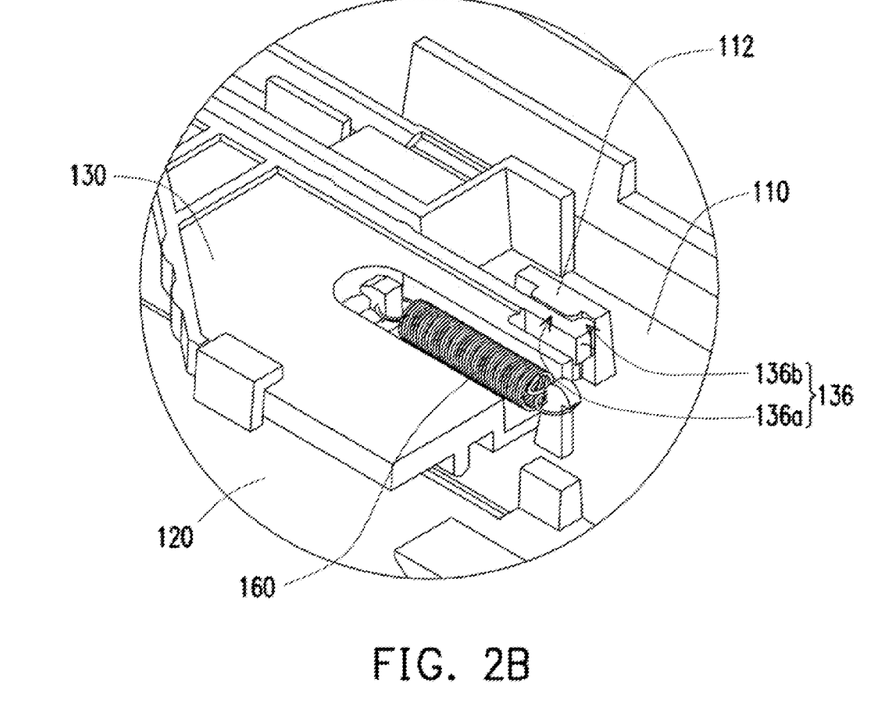

FIG. 1A and FIG. 1B are respectively schematic views of an electronic device at different viewing angles according to an embodiment of the present invention. FIG. 2A and FIG. 2B are respectively partial enlarged views of the electronic device in FIG. 1A at different parts. Referring to FIG. 1A, FIG. 1B, FIG. 2A, and FIG. 2B, in this embodiment, the electronic device 100 is, for example, a notebook computer, and in order to clearly illustrate a latching structure for installing or detaching a cover, only partial components are shown herein. The electronic device 100 includes a casing 110, a cover 120, a latching member 130, and a limiting member 140. The casing 110 has an accommodation space C1 and a first stopping portion 112, in which the first stopping portion 112 is disposed on an inner wall of the casing 110 and is located in the accommodation space C1. The cover 120 is detachably assembled to the casing 110 along a first axis L1. The latching member 130 has a main body 132, a limiting portion 134, and a second stopping portion 136 extending from the main body 132. The main body 132 is configured on the inner wall of the casing 110 and is located in the accommodation space C1. The limiting member 140 is detachably assembled to the casing 110 and interferes with the limiting portion 134.

FIG. 3A to FIG. 3D are respectively schematic views of moving states of the latching member relative to the casing. Referring to FIG. 3A to FIG. 3D, the main body 132 moves relative to the casing 110 between a first position P1 and a second position P2 along a second axis L2, the first axis L1 is substantially perpendicular to the second axis L2, and the first stopping portion 112 is located in a moving path of the second stopping portion 136.

The limiting portion 134 has a limiting route R1, and a start point E1 and an end point E2 of the limiting route R1 are respectively located at the first position P1 and a third position P3 of the main body 132 relative to the casing 110, in which the third position P3 is between the first position P1 and the second position P2. Further referring to FIG. 1A to FIG. 2B, the electronic device 100 further includes a handle 150, movably assembled on the casing 110. In this embodiment, the handle 150 has a pushing portion 152 and an embedded portion 154, in which the pushing portion 152 is located on an outer wall of the casing 110, and the embedded portion 154 penetrates the casing 110 to protrude into the accommodation space C1 and is embedded in the main body 132 of the latching member 130. Thereby, a user may apply a force on the pushing portion 152 to propel the latching member 130 to move relative to the casing 110.

In this embodiment, the limiting portion 134 of the latching member 130 is, for example, an opening. The limiting member 140 is, for example, a screw locked into the casing 110 from the outer wall of the casing 110, and the locked screw protrudes into the accommodation space C1 and is inserted in the opening (the limiting portion 134) of the main body 132. Through the interference between the limiting member 140 and the limiting portion 134, a limiting structure having a limiting route R1 as an inner diameter of the opening is obtained, and thus the main body 132 is enabled to move between the first position P1 and the third position P3. In other words, when the user intends to detach the cover 120 from the casing 110, the handle 150 propels the main body 132 of the latching member 130 to move from the first position P1 towards the second position P2. However, at this time, due to the interference between the limiting member 140 and the limiting portion 134, the main body 132 can only move to the third position P3 first.

FIG. 4A to FIG. 4D are respectively partial enlarged views of the handle in different states relative to the casing, in which the moving states of the handle 150 are corresponding to the moving states of the latching member 130 in FIG. 3A to FIG. 3D. Referring to FIG. 4A to FIG. 4D in contrast to FIG. 3A to FIG. 3D, in this embodiment, an orthogonal projection of the limiting member 140 on the casing 110 is located in an orthogonal projection of the handle 150 between the first position P1 and the third position P3 on the casing 110. In other words, when the latching member 130 moves between the first position P1 and the third position P3, the limiting member 140 is substantially shielded by the pushing portion 152 of the handle 150 on the casing 110. Therefore, the latching structure of the cover 120 is well concealed, and the cover 120 may not be easily detached from the casing 110 as the limiting member 140 is exposed out of the casing 110.

Figure 3A:
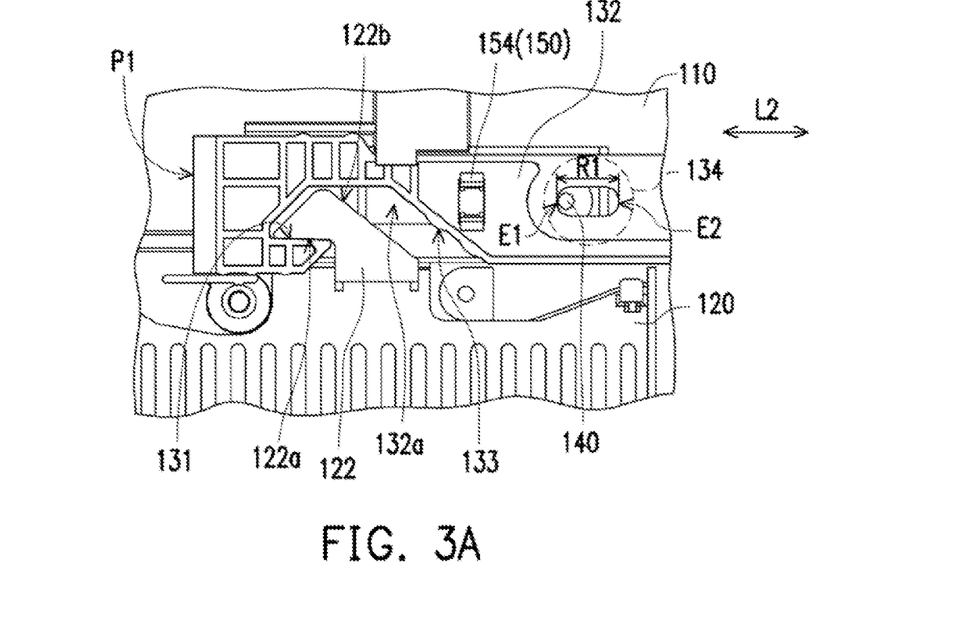
FIG. 3A to FIG. 3D are respectively schematic views of moving states of a latching member relative to a casing.
Figure 3B:
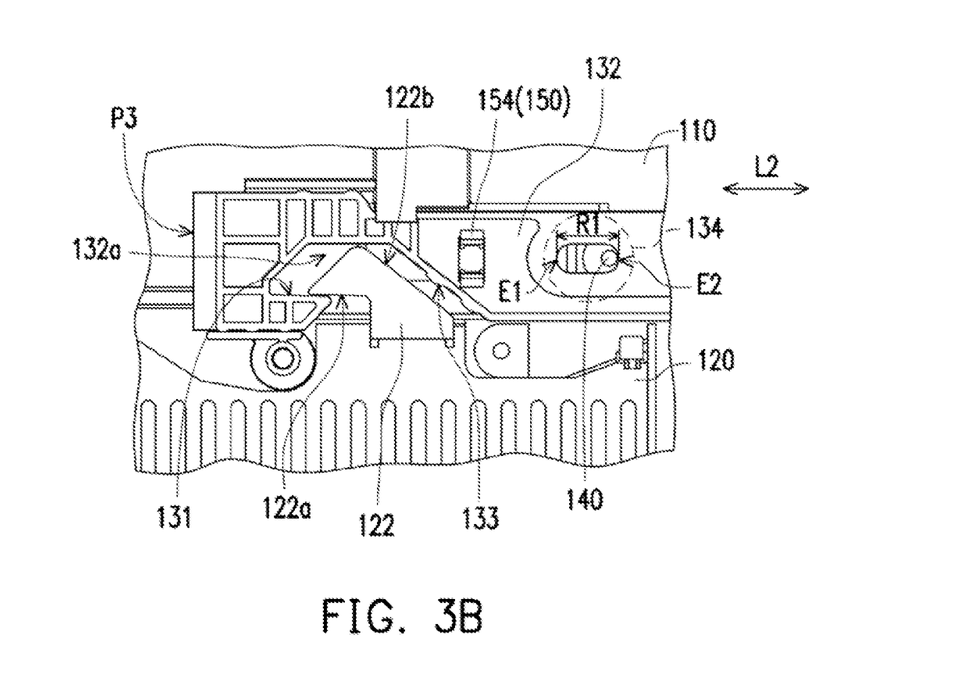
Figure 3C:
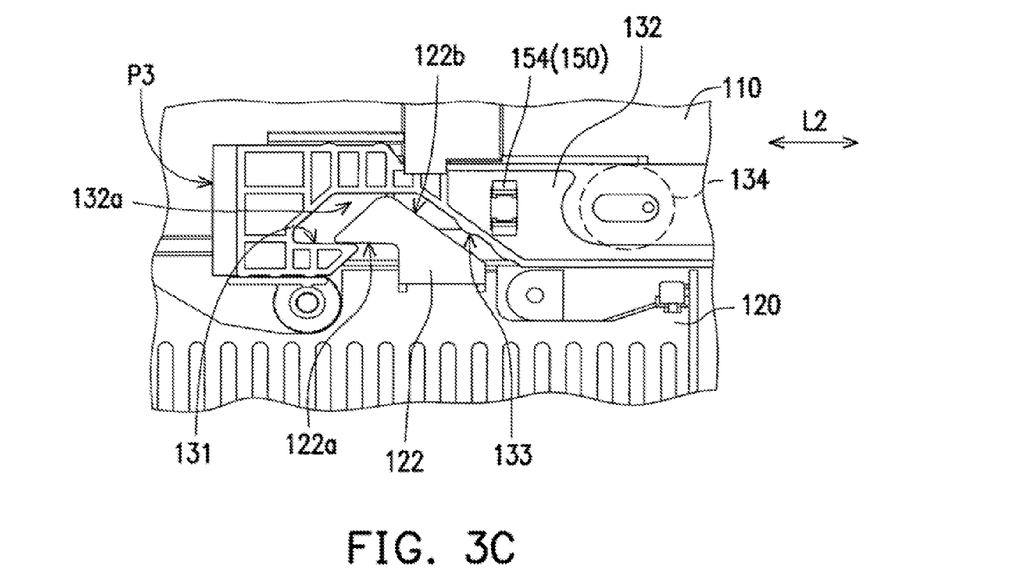
Figure 3D:
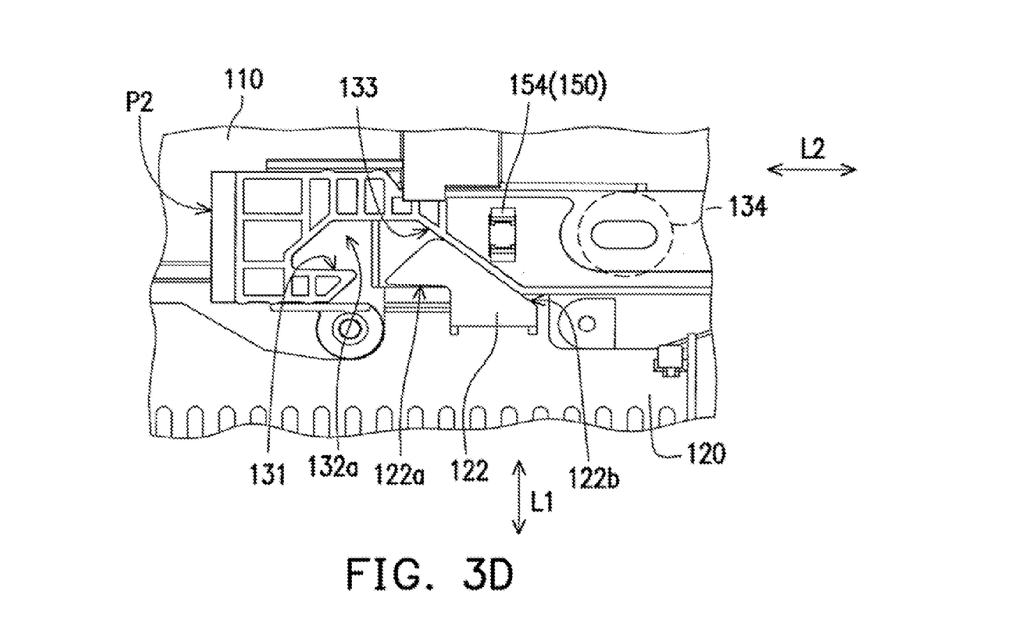
Figure 4A:
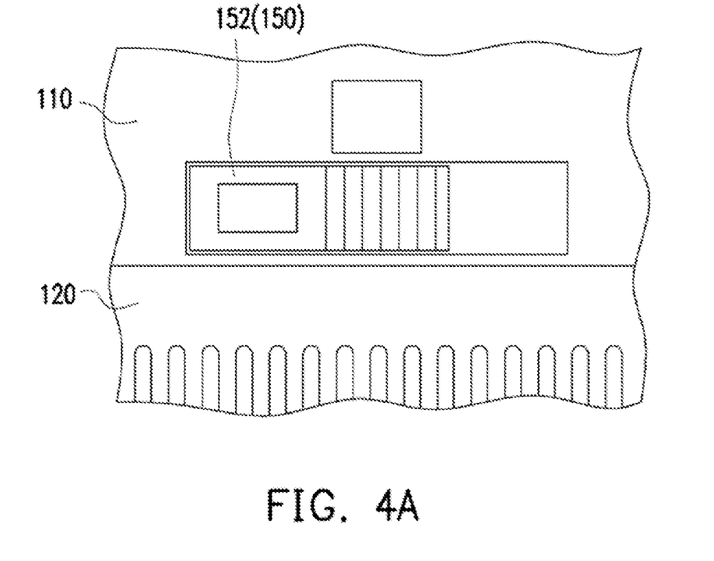
FIG. 4A to FIG. 4D are respectively partial enlarged views of a handle in different states relative to the casing.
Figure 4B:
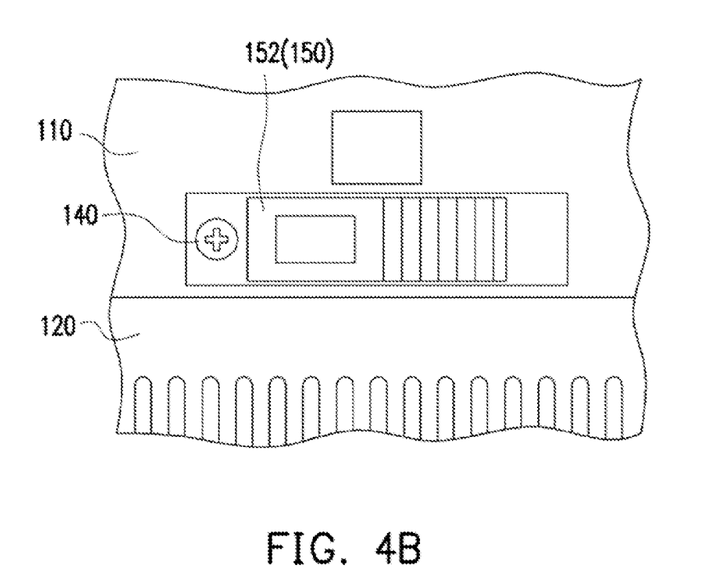
Figure 4C:
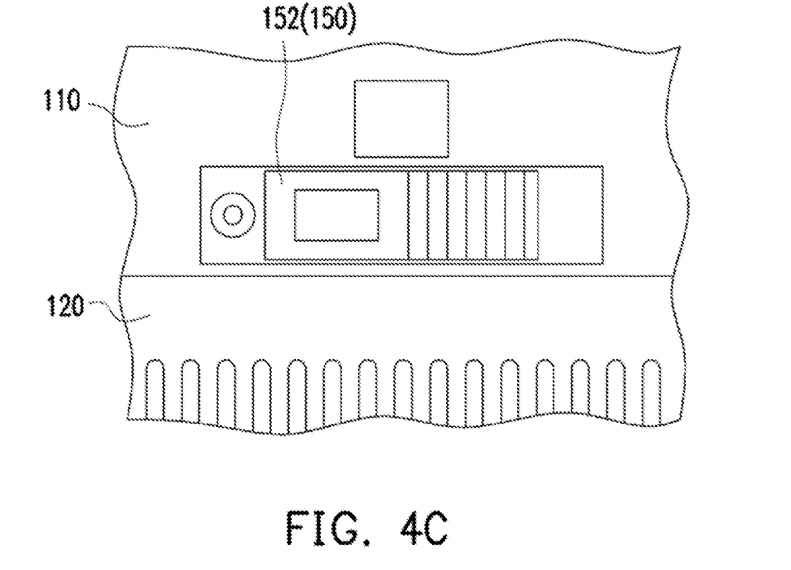
Figure 4D:
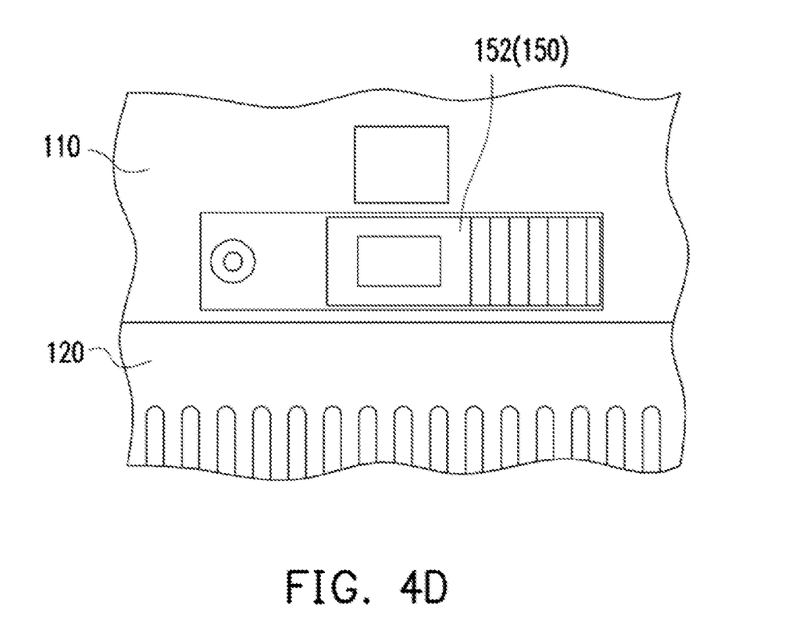

After the operation of the latching member 130, when the latching member 130 stops at the third position P3 due to the interference of the limiting member 140, the limiting member 140 is exposed out of the casing 110 as the pushing portion 152 of the handle 150 moves away. At this time, to continuously detach the cover 120, the limiting member 140 must be first removed from the casing 110 (as shown in FIG. 4C and FIG. 3C). When the limiting member 140 is removed and no component interferes with the latching member 130, the user drives the latching member 130 to continuously move from the third position P3 towards the second position P2 along the second axis L2.

In this embodiment, the main body 132 has a recessed portion 132a facing the cover 120, the latching member 130 further has a first buckling portion 131 and a first urging portion 133, and the first buckling portion 131 and the first urging portion 133 are located on two opposite sides of the recessed portion 132a. Further, in this embodiment, the cover 120 has a hook 122, located on the inner wall of the casing 110 and in the recessed portion 132a of the main body 132. The hook 122 has a second buckling portion 122a and a second urging portion 122b, respectively corresponding to the first buckling portion 131 and the first urging portion 133. The first buckling portion 131 and the second buckling portion 122a are respectively a plane perpendicular to the first axis L1, and the first urging portion 133 and the second urging portion 122b are respectively a plane forming an acute angle with the first axis L1. In other words, when the latching member 130 is located between the first position P1 and the third position P3, the first buckling portion 131 is retained to the second buckling portion 122a and prevents the cover 120 from departing from the casing 110 along the first axis L1, so as to closely assemble the cover 120 to the casing 110. When the limiting member 140 is detached and the latching member 130 continuously moves from the third position P3 to the second position P2, the main body 132 of the latching member 130 moves along the second axis L2, the first urging portion 133 rests on the second urging portion 122b, and the latching member 130 and the cover 120 originally having the perpendicular first axis L1 and second axis L2 urge against each other through their bevel surface structures, such that the main body 132 of the latching member 130 moves along the second axis L2 to cause the cover 110 pushed away from the casing 110 by the latching member 130 along the first axis L1. Till then, the user successfully detaches the cover 120 from the casing 110.

Figure 5A:
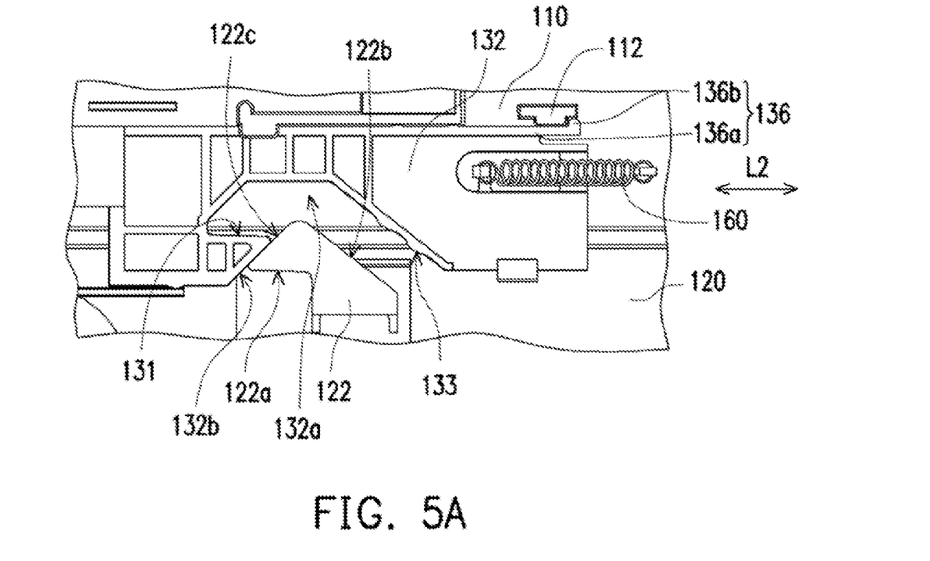
FIG. 5A and FIG. 5B are respectively partial enlarged views of the electronic device in FIG. 1A in different states.
Figure 5B:
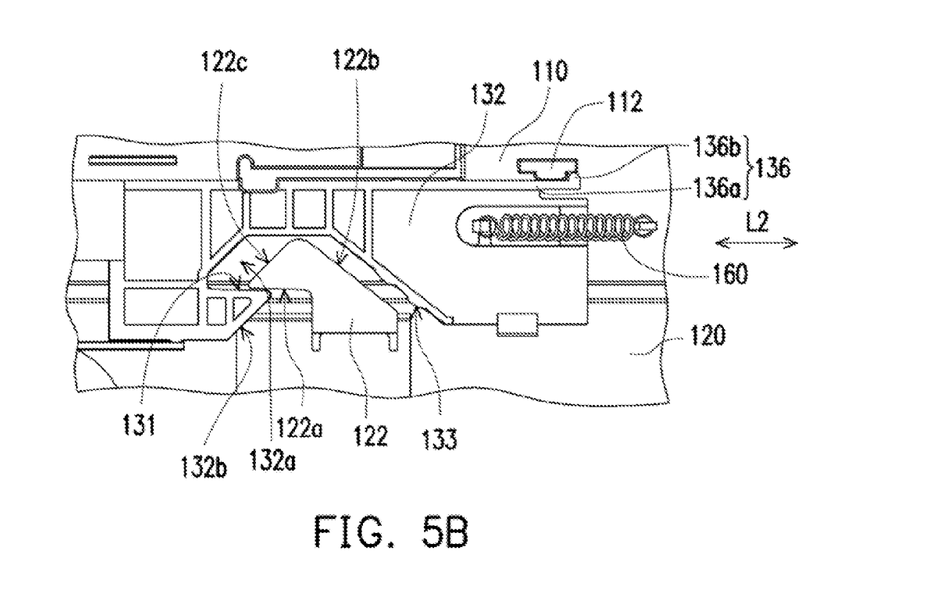

FIG. 5A and FIG. 5B are respectively partial enlarged views of the electronic device in FIG. 1A in different states.

Referring to FIG. 5A and FIG. 5B, in this embodiment, the electronic device 100 further includes an elastic member 160, connected between the casing 110 and the main body 132 of the latching member 130. When the latching member 130 moves from the first position P1 to the second position P2 as shown in FIG. 3A to FIG. 3D, the latching member 130 stretches the elastic member 160. Thereby, when the user detaches the cover 120 and releases the force originally applied to the handle 150, the elastic force from the elastic member 160 drives the latching member 130 to move from the second position P2 towards the first position P1 along the second axis L2, so as to recover the original state of the elastic member 160 before being stretched, and thus the latching member 130 returns to its original position.

It should be noted that, the first stopping portion 112 of the casing 110 is located in the moving path of the second stopping portion 136 of the latching member 130, so that the latching member 130 is limited to the first stopping portion 112 of the casing 110 and stops between the first position P1 and the second position P2. Moreover, the main body 132 further has a third urging portion 132b, with its back side facing the recessed portion 132a. The hook 122 further has a fourth urging portion 122c, corresponding to the third urging portion 132b, and the third urging portion 132b and the fourth urging portion 122c are respectively a plane forming an acute angle with the first axis L1. Thereby, when the user intends to install the cover 120 back to the casing 110 and applies a force to push the cover 120 towards the latching member 130 along the first axis L1, the fourth urging portion 122c rests on the third urging portion 132b, so as to push the latching member 130 to enable the hook 122 of the cover 120 to enter the recessed portion 132a of the main body 132, such that the first buckling portion 131 is retained to the second buckling portion 122a and the cover 120 is buckled to the casing 110.

Due to the cooperation between the first stopping portion 112 and the second stopping portion 136, the latching member 130 only restores a part of the original stretching route of the elastic member 160, so that the user does not need to apply a force on the cover 120 to completely resist the elastic member 160, and the cover 120 can be retained to the casing 110 without falling off by a relatively small force. Therefore, the latching structure of this embodiment facilitates the operation of the user.

In another aspect, the second stopping portion 136 has a protrusion 136b facing the first stopping portion 112 and an elastic arm 136a connected between the main body 132 and the protrusion 136b, that is, when the user drives the main body 132 of the latching member 130 to move from the first position P1 towards the second position P2, due to the elasticity of the elastic arm 136a, the force applied by the user overcomes the interference between the first stopping portion 112 and the second stopping portion 136, and the main body 132 successfully moves to the second position P2. Only when the main body 132 of the latching member 130 returns to its original position due to the elastic force of the elastic member 160, the first stopping portion 112 and the second stopping portion 136 interfere to make the main body 132 stop between the first position P1 and the second position P2.

It should be noted that, when the main body 132 moves from the second position P2 towards the first position P1, the position where the first stopping portion 112 interferes with the second stopping portion 136 to cause the suspension of the main body 132 is substantially the third position P3. In this manner, the handle 150 returns to the position shown in FIG. 4B, and the user is enabled to secure the limiting member 140 to the casing 110. Since the handle 150 is still in the state shown in FIG. 4B at this time, the user finally applies a force to the handle 150, to make the pushing portion 152 return to the original position to shield the limiting member 140 (as shown in FIG. 4A), and thus the limiting member 140 is well concealed.

In view of the above, according to the embodiments of the present invention, in the electronic device, through the cooperation of the stopping portions of the latching member and the casing, the latching member only returns to the third position between the first position and the second position after the cover is detached, so that when the user intends to install the cover, only a small force is required to retain the cover on the casing. Therefore, in the electronic device of the present invention, the cover can be installed or detached conveniently by using a few components.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:
1. An electronic device, comprising:
 a casing, comprising an accommodation space and a first stopping portion, wherein the first stopping portion is disposed on an inner wall of the casing and is located in the accommodation space;
 a cover, detachably assembled to the casing along a first axis so as to cover the accommodation space;
 a latching member, disposed on the inner wall of the casing and located in the accommodation space, wherein the latching member comprises a main body and a limiting portion, the main body moves between a first position and a second position along a second axis, and the first stopping portion is located in a moving path of the latching member; and
 a limiting member, detachably assembled to the casing and interfering with the limiting portion, wherein the limiting portion comprises a limiting route, when the limiting member interferes with the limiting portion, a start point and an end point of the limiting route respectively limit the main body at the first position and a third position relative to the casing, and the third position is between the first position and the second position;
 wherein the main body comprises a recessed portion, the latching member further comprises a first buckling portion and a first urging portion, and the first buckling portion and the first urging portion are located in two opposite sides of the recessed portion;
 wherein the cover comprises a hook, located on the inner wall of the casing and in the recessed portion of the main body, and the hook comprises a second bucking portion and a second urging portion, respectively corresponding to the first buckling portion and the first urging portion.
2. The electronic device according to claim 1, further comprising:
 a handle, movably assembled on the casing and connected to the main body to move with the main body, wherein an orthogonal projection of the limiting member on the casing is located in an orthogonal projection of the handle between the first position and the third position on the casing.
3. The electronic device according to claim 1, wherein the first buckling portion and the second buckling portion are respectively a plane perpendicular to the first axis.

4. The electronic device according to claim 1, wherein the first urging portion and the second urging portion are respectively a plane forming an acute angle with the first axis.

5. The electronic device according to claim 1, wherein the main body further comprises a third urging portion, with its back side facing the recessed portion, the hook further comprises a fourth urging portion corresponding to the third urging portion, and the third urging portion and the fourth urging portion are respectively a plane forming an acute angle with the first axis.

6. The electronic device according to claim 1, further comprising:
an elastic member, connected between the casing and the main body, for providing the main body with an elastic force in parallel with the second axis.

7. An electronic device, comprising:
a casing, comprising an accommodation space and a first stopping portion, wherein the first stopping portion is disposed on an inner wall of the casing and is located in the accommodation space;
a cover, detachably assembled to the casing along a first axis so as to cover the accommodation space;
a latching member, disposed on the inner wall of the casing and located in the accommodation space, wherein the latching member comprises a main body and a limiting portion, the main body moves between a first position and a second position along a second axis, and the first stopping portion is located in a moving path of the latching member; and
a limiting member, detachably assembled to the casing and interfering with the limiting portion, wherein the limiting portion comprises a limiting route, when the limiting member interferes with the limiting portion, a start point and an end point of the limiting route respectively limit the main body at the first position and a third position relative to the casing, and the third position is between the first position and the second position;
wherein the latching member further comprises a second stopping portion extending from the main body and located in the moving path of the first stopping portion, and a position where the first stopping portion interferes with the second stopping portion of the main body is the third position of the main body relative to the casing.

8. The electronic device according to claim 7, wherein the second stopping portion comprises a protrusion facing the first stopping portion and an elastic arm connected between the main body and the protrusion.

* * * * *